Figure 1:
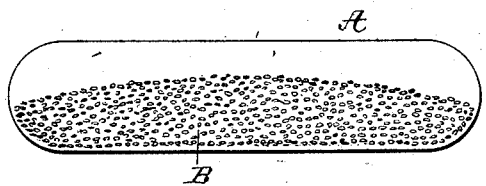

A. P. ANDERSON.
ART OF TREATING STARCH MATERIAL.
(Application filed Feb. 12, 1902.)

(No Model.)

Witnesses:
F. H. Schott
Anton A. Gloetzner

Inventor:
Alexander P. Anderson
By
his Attorney.

UNITED STATES PATENT OFFICE.

ALEXANDER P. ANDERSON, OF NEW YORK, N. Y.

ART OF TREATING STARCH MATERIAL.

SPECIFICATION forming part of Letters Patent No. 707,892, dated August 26, 1902.

Application filed February 12, 1902. Serial No. 93,797. (No specimens.)

*To all whom it may concern:*

Be it known that I, ALEXANDER P. ANDERSON, a citizen of the United States of America, residing at New York, in the State of New York, have invented certain new and useful Improvements in the Art of Treating Starch Materials; and I do hereby declare the following to be a full, clear, and exact description of the invention, such as will enable others skilled in the art to which it appertains to make and use the same.

My invention relates to the art of treating all kinds of starch materials—that is to say, starch or materials containing starch or mixtures of both.

The objects of my invention are to provide a dry method of swelling starch materials of all kinds to render them porous, thereby enhancing their nutritive value and rendering them more readily and completely digested than when used in their present form and rendering them more valuable otherwise in the arts—for example, for sizing and as pastes.

My invention is based on the discovery which I have made that the liquid generally assumed to be composed mainly of hygroscopic water contained in the starch granules of all starch materials when in a substantially air-dried state may be utilized to expand or swell the same evenly and homogeneously in all directions, thus loosening the starch particles and rendering the starch exceedingly porous, so as to be readily digested and readily taken up by liquids. This action takes place whenever the liquid is caused to suddenly change to the gaseous condition, or, in other words, to explode, with such rapidity that the same cannot escape with sufficient speed by diffusion through the coatings of the starch granules. These coatings of the starch granules are composed of what is known as "starch cellulose," and it is a part of my discovery that the same will retain the gases within the granules to a sufficient extent to cause the explosive action above referred to if a method be devised whereby the liquid contained in the granules passes into the gaseous state with sufficient rapidity.

In carrying out my invention I preferably heat any "starch material," under which term when used in the specification and claims I comprise starch of all kinds and all substances and products containing starch—such, for example, as cereals of every description and every kind of amylaceous seeds or kernels—under gas-pressure—such, for example, as air-pressure—to a point above the boiling-point of the liquid contained in the starch granules at normal atmospheric pressure, or, what is practically the same thing, above the boiling-point of water at normal atmospheric pressure, for a period of time not long enough to permit the escape of too much of the liquid contained in the granules through the granule coatings by diffusion. I thereupon while substantially maintaining the said temperature release or remove the pressure from the starch materials with such rapidity that the liquid will suddenly burst or flash into gaseous form or steam, which will result in an instantaneous expansion or explosion of the entire mass of the starch material into several times its original volume, the said material being evenly and homogeneously swelled into a very porous mass. This expansion is such that the grains or lumps composed of an aggregation of numerous granules, or, in the case of cereals or seeds, each kernel preserves its exact original shape and becomes a very much enlarged and porous copy of the original body, provided the heat applied be sufficient to render the granule material sufficiently coherent after the explosion. What I consider the best temperature for this purpose is given below, and it is probable that such temperature softens the starch cellulose sufficiently to become adhesive or sticky.

It should be observed that it is within the scope of my invention not only to quickly remove the entire pressure upon the starch material while heated to a certain temperature under such pressure, but also to merely reduce the said pressure to a point sufficiently below the point at which the liquid contained in the granules will boil at such temperature to cause the same to suddenly burst into a gaseous condition. The important point under all conditions is to heat the starch material under any pressure and thereafter while the same is thus heated to suddenly reduce said pressure sufficiently below the point at which the liquid boils at the temperature imparted to cause the same to suddenly gasify.

My invention therefore, broadly considered, consists in heating the starch material to a certain temperature under a substantially dry gaseous pressure and then quickly reducing the pressure to a point below that at which the liquid contained in the granules contained in the starch granules boils at said temperature.

My invention also consists in such other features, methods, and steps as will be hereinafter described, and pointed out in the claims.

I will now proceed to describe the manner of carrying out my process in the best form known to me at present, reference being had to the accompanying drawings, which represent different forms of vessels or receptacles described in the specification for receiving the starch material when treated according to my invention, it being of course understood that my present invention is independent of any particular apparatus, the apparatus at present shown and described being merely illustrations of the endless forms of appliances that may be employed in putting my invention into practice.

Figure 2:
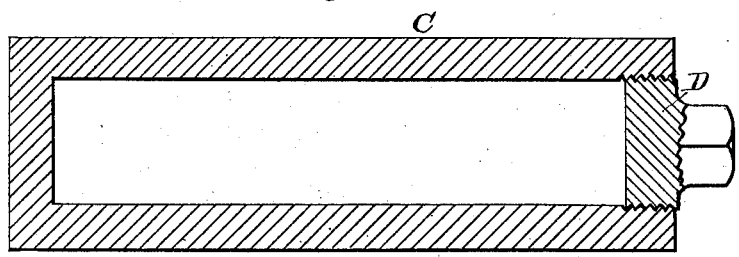

In said drawings, Figure 1 represents a side elevation of a sealed glass tube containing the starch material to be treated. Fig. 2 represents a longitudinal section of a metallic cylinder which may also be used for my process, and Fig. 3 represents a similar view of another form of metallic vessel for the same purpose.

The starch material, which may be any one or several of the products or substances enumerated above, is placed in a vessel, which is then closed hermetically. The vessel is now subjected to heating intensely enough to raise the temperature of the vessel to the desired point—say from 125° to 300° centigrade—within a short period of time—say not exceeding forty-five minutes. This heating of the vessel of course causes an increase in the pressure of the confined air in the vessel. At the completion of this step of the process the vessel is suddenly opened, thus quickly reducing the pressure of the confined air to normal. The result will be a practically instantaneous swelling of the starch granules, so that the material being treated has a greatly-increased volume. In view of this sudden swelling it is important either to employ a vessel whose capacity is sufficient to contain the starch material when swollen or to provide means for the quick discharge of the material being treated from the vessel when the latter is opened in order to allow sufficient space for the swelling of the starch at the moment of the reduction of the pressure. In carrying out my process in a small way I have heretofore constructed the vessel in the form of glass tubes A, Fig. 1, which were sealed by fusion when the necessary amount of starch material B was placed within such tubes in a manner well known to chemists. After quickly heating the tubes to the desired temperature they are broken in any suitable way or will sometimes burst, owing to the pressure of the confined air. In either case the pressure of the air is suddenly reduced and the starch granules are at once swollen. For the practice of my invention on a large scale suitable metallic vessels in the form of air-tight cylinders C, Fig. 2, with removable heads D may be employed. These are partly filled with the material to be treated and closed, then thrust into an oven of a temperature great enough to raise the contents of the cylinder to the required temperature with sufficient rapidity. For example, the temperature of the oven may vary between 125° and 300° centigrade, and the time during which the vessel is submitted to the heating of such an oven may vary from approximately ten minutes to forty-five minutes, being inversely proportional to the temperature. Thereupon the cylinder C is quickly removed from the oven and the cylinder-head D immediately taken off. If desired, other means for applying the fluid-pressure to the granule liquid of the starch may be employed to raise the boiling-point of said liquid—for example, by compressing air in the vessel containing the material to be treated during the application of the heat to such vessel—in which case the hermetical sealing of the vessel is not important, provided the leakage of air is not greater than the air-compressing mechanism can meet and still maintain the desired pressure.

Figure 3:
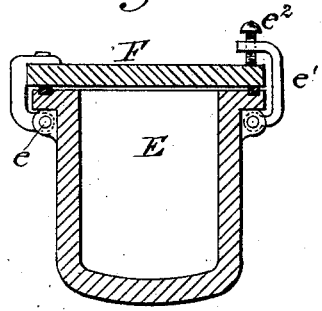

In Fig. 3 I have shown another form of metallic receiver for containing the starch material while being treated, said receiver consisting of the receiver-body E and lid F, hinged at $e$ and provided at an opposite point with the hinged clamp $e'$, having a clamp-screw $e^2$. The upper edge of the receiver may be provided with an annular air-tight packing $f$, as shown. When the receiver is filled to the proper extent with the starch material and closed in the manner indicated in the drawings, it is thrust into the oven, and after having been acted on for a sufficient length of time it is removed and the screw $e^2$ somewhat loosened, whereupon after the receiver is placed in the proper position a blow of the hammer will suffice to swing the clamp $e'$ out of the way and the lid will be thrown open, permitting the rapid expansion and partial escape of the suddenly-swelled contents.

In carrying out my process the starch material should not be maintained too long at the ultimate temperature to which it is raised, as otherwise in many cases it will become charred, and thereby defeat the sudden expansive action of the gases formed. On the other hand, it should not be kept at the heated point for too short a space of time. I find the limits of time and temperature given above as conducive to the best results. Within said limits, however, there will be some difference in the taste and nature of the product. It is also important that the reduction of pressure be brought about quickly, and my experience has been that the best results are obtained by a close approach to an instantaneous reduction of the pressure. In all cases if such reduction of pressure be not quick enough there will be no swelling whatever of the starch granules, and the operation will be a failure. It is also important that at the moment of reducing the pressure the material to be treated shall have sufficient space around it within which to expand freely when the pressure is removed, as otherwise the swelling will be limited, depending upon the room allowed for the purpose. However, it is at the same time important that not too large a space be left above the starch material to prevent a too extensive diffusion of the liquid contained in the starch granules into the gas contained in said space. I generally find that the best results are obtained by filling the receiver about two-thirds full, which of course necessitates that on relieving the pressure a large opening for the escape of the expanded material be provided. If the pressure be not reduced with sufficient rapidity, the granule liquid will be turned to steam or vapor so slowly that it can pass out through the walls of the granules as fast as produced, thereby not developing sufficient pressure to burst the granules. If the temperature to which the material is raised be too low, the granule liquid will not be brought to its boiling-point, and hence upon the reduction of the pressure will not burst into steam, which also will render the process unsuccessful. If the temperature to which the material is subjected be too high, the material will be burned and the liquid contained in the starch granules will be driven off as steam through the walls of the granules, rendered porous and weak by such burning, without sufficient pressure to burst the granules.

My process is fundamentally distinguished from processes for treating starch materials heretofore known by that the starch materials are submitted to substantially dry pressure or to gas-pressure in a substantially air-dry condition and in that the pressure is removed suddenly at the end of the process. Both of these features are essential to obtaining my result—namely, a great expansion of the starch material combined with a preservation of the starch and the original shape of the said starch material. If the starch material is in a wet condition or the pressure is not suddenly removed, entirely and radically different results will follow.

It is to be observed that while the best results are perhaps obtained under my process if the material to be treated is in an absolutely air-dry condition considerable latitude may be allowed in this respect. Thus, for example, if the starch material be kiln-dried, so as to remove a portion of the liquid contained in the starch granules in the air-dried state, the process will still be operative, although not leading to so good a result and so great a swelling effect as when all the granule liquid is allowed to remain. On the other hand, a small amount of moisture in addition to the liquid contained in the granules either in the granules of the starch material or in the gas pressing on the starch material during the heating stage will not interfere with my process. The fact that such latitude in both directions is allowed without departing from my inventions as claimed I have expressed by stating that the starch material is to be "substantially air-dry." It is also to be noted that a certain amount of moisture or vapor in the gas pressing upon the material above the amount necessary for saturation will not prevent the result above described from being obtained. However, it is preferable to work with an absolutely dry gas—that is, one whose amount of water or other liquid is not above the saturation-point. In employing the term "substantially dry pressure" in the claims I desire to be understood as covering a dry pressure or any pressure approximating such dry pressure so nearly as to bring about my result, though perhaps in a less degree. The pressure must be reduced with such suddenness as to produce the explosive effect described on the starch granules. The nearer the reduction of pressure can be brought to instantaneous the better, although there is here also a certain latitude as to the degree of suddenness with which the pressure is reduced or relieved may be allowed. In construing the term "suddenly reducing the pressure," as employed in the claims, it is therefore to be understood any rapidity of reduction of pressure which will result in the explosive effect described is comprehended under said term.

The product resulting from the application of my process is a highly-porous starch material exactly preserving the shape and the appearance of the original product, though on a greatly-enlarged scale. It is in this shape readily dissolved by the saliva and gastric juices and is ready as a food, being, in fact, dry-cooked. It is readily emulsified by simply adding water or other liquid, so that the starches proper readily lend themselves to use in the arts for sizing, pasting, &c.

I am aware that heretofore grain has been subjected to heat and pressure and a subsequent relief of such pressure; but this treatment has always been carried out while the material was in a moist or wet condition, so that the resultant product was a thin paste suitable for distilling purposes and not by any means a dry, porous, or spongy product, generally preserving its original shape, though on a greatly-enlarged scale. As explained above, it is essential to my invention that the material as treated be substantially air-dry or that a dry pressure be employed—a condition of things utterly impossible and out of the question in the methods as heretofore practiced. My invention is essentially distinguished from these methods in that it is based on the explosive action of the liquid contained in the starch granules of the dry material and results in a dry porous product, preserving its original shape in substance, while the former processes involve the macerating or digesting action of the water in which the material is steeped or moistened and result in an entirely different product—viz., a paste.

While I have hereinabove referred to the treatment of starches proper under my process in exemplification of the same and such treatment is covered generically, I do not claim the same specifically herein, since the same is described in my application, Serial No. 115,222, filed July 11, 1902; nor do I herein cover the products resulting from the treatment of starch proper and cereal grains under said invention, since the same are separately claimed in my application, Serial No. 115,222, above referred to, and in application, Serial No. 115,221, filed July 11, 1902.

Having thus fully described my invention, what I claim as new, and desire to secure by Letters Patent, is as follows:

1. The process of treating starch material, which consists in heating such material in a substantially air-dry condition under pressure and then reducing the pressure with such rapidity that the liquid contained in the starch granules is suddenly gasified.

2. The process of treating starch material, which consists in heating such material in a substantially air-dry condition, under pressure to a point below the boiling-point of the liquid contained in the granules of the starch material at the pressure applied and thereupon suddenly removing said pressure.

3. The process of treating starch material, which consists in heating such material in a substantially air-dried condition and under gas-pressure to a temperature above the boiling-point of the liquid contained in the starch material at normal pressure and thereupon suddenly reducing the pressure.

4. The process of treating starch material, which consists in heating said material in a substantially air-dry condition and under pressure to a temperature above the boiling-point of water at normal pressure and thereupon suddenly reducing the pressure.

5. The process of treating starch material, which consists in submitting the material in a substantially air-dry condition to a continuously-increasing pressure while raising its temperature above the boiling-point of water, and then suddenly reducing said pressure.

6. The process of treating starch material, which consists in raising the material in a substantially air-dry condition to a temperature of substantially 125° centigrade, while simultaneously submitting it to a fluid-pressure above the normal, and then suddenly reducing said pressure.

7. The process of treating starch material, which consists in raising the material in a substantially air-dry condition to a temperature not exceeding 300° centigrade, while simultaneously submitting it to fluid-pressure above the normal, and then suddenly reducing said pressure.

8. The process of treating starch material, which consists in raising the material in a substantially air-dry condition above the boiling-point of water in a closed vessel and then suddenly opening said vessel.

9. The process of treating starch material, which consists in raising the material in a substantially air-dry condition to a temperature not exceeding 300° centigrade, in a closed vessel, and then suddenly opening said vessel.

10. The process of treating starch and material containing starch, which consists in raising the material in a substantially air-dry condition to a temperature not exceeding 300° centigrade, in a closed vessel whose capacity is in excess of the space occupied by the material, and then suddenly opening said vessel.

11. The process of treating cereal grains, which consists in heating the same in a substantially air-dry condition and under pressure to a point above the boiling-point of water at normal pressure and thereafter suddenly reducing the pressure.

12. The process of treating cereal grains, which consists in heating the same in a substantially air-dry condition and under pressure to a temperature not exceeding 300° centigrade, and thereupon suddenly reducing the pressure to a point at which the liquid in the starch granules of the cereal grains will gasify.

In testimony whereof I affix my signature in presence of two witnesses.

ALEXANDER P. ANDERSON.

Witnesses:
M. C. MASSIE,
ANTON A. GLOETZNER, Jr.